US011255061B1

(12) United States Patent
Lopez

(10) Patent No.: US 11,255,061 B1
(45) Date of Patent: Feb. 22, 2022

(54) WATER WAVE BREAKER APPARATUS, SYSTEM, AND METHOD

(71) Applicant: J&L Cooling Towers, Inc., Bensenville, IL (US)

(72) Inventor: Jose Lopez, Bensenville, IL (US)

(73) Assignee: J&L COOLING TOWERS, INC., Bensenville, IL (US)

( * ) Notice: Subject to any disclaimer, the term of this patent is extended or adjusted under 35 U.S.C. 154(b) by 0 days.

(21) Appl. No.: 17/072,140

(22) Filed: Oct. 16, 2020

(51) Int. Cl.
*E02B 3/06* (2006.01)
(52) U.S. Cl.
CPC ..................................... *E02B 3/06* (2013.01)
(58) Field of Classification Search
CPC ................................. E02B 3/06; E02B 3/04
USPC ...................................................... 405/31, 32
See application file for complete search history.

(56) References Cited

U.S. PATENT DOCUMENTS

| | | | |
|---|---|---|---|
| 3,490,239 A | 1/1970 | Vincent | |
| 4,407,608 A | 10/1983 | Hubbard | |
| 4,498,805 A | 2/1985 | Weir | |
| 4,818,141 A | 4/1989 | Rauch | |
| 5,123,780 A | 6/1992 | Martinsen | |
| 5,655,851 A | 8/1997 | Chor | |
| 2012/0308305 A1* | 12/2012 | Kaye | E02B 3/06 405/16 |
| 2014/0227033 A1* | 8/2014 | Scheel | E02B 3/10 405/25 |

FOREIGN PATENT DOCUMENTS

KR    653381    * 12/2006

* cited by examiner

*Primary Examiner* — Sean D Andrish
(74) *Attorney, Agent, or Firm* — Klintworth & Rozenblat IP LLP

(57) ABSTRACT

A water wave breaker includes an attachment portion and a curved concave portion. The curved concave portion is connected with the attachment portion. When the attachment portion is attached to a substantially vertically extending surface a first end of the curved concave portion, which is disposed laterally farther away from the attachment portion than a second end of the curved concave portion, is disposed above the second end of the curved concave portion with the curved concave portion oriented in a downward direction away from the substantially vertically extending surface.

46 Claims, 6 Drawing Sheets

WATER WAVE BREAKER APPARATUS, SYSTEM, AND METHOD

FIELD OF THE DISCLOSURE

This disclosure relates to water wave breaker apparatus, systems, and methods for protecting water breaker walls and other structures from the damaging effects of incoming water waves.

BACKGROUND

Water waves from large bodies of water can do a tremendous amount of damage to structures coming into contact with the waves. This can cause structures to deteriorate, walkways to be filled with water causing slips and falls, and other damaging effects.

A water wave breaker apparatus, system, and method are needed to protect against the damaging effects emulating from water waves.

SUMMARY

In one embodiment, a water wave breaker apparatus is disclosed. The water wave breaker apparatus includes an attachment portion and a curved concave portion. The curved concave portion is connected with the attachment portion. When the attachment portion is attached to a substantially vertically extending surface a first end of the curved concave portion, which is disposed laterally farther away from the attachment portion than a second end of the curved concave portion, is disposed above the second end of the curved concave portion with the curved concave portion oriented in a downward direction away from the substantially vertically extending surface.

In another embodiment, a water breaker system is disclosed. The water breaker system includes a substantially vertically extending surface and a water breaker apparatus. The substantially vertically extending surface is in contact with or adjacent to a body of water. The water wave breaker apparatus includes an attachment portion and a curved concave portion. The attachment portion is attached to the substantially vertically extending surface. The curved concave portion is connected with the attachment portion. A first end of the curved concave portion, which is disposed laterally farther away from the attachment portion than a second end of the curved concave portion, is disposed above the second end of the curved concave portion with the curved concave portion oriented in a downward direction away from the substantially vertically extending surface In still another embodiment, a method of erecting and/or using a water breaker system is disclosed. In one step, an attachment portion of a water breaker apparatus is attached to a substantially vertically extending surface in contact with or adjacent to a body of water. In another step, a first end of a curved concave portion of the water breaker apparatus is oriented laterally farther away from the attachment portion than a second end of the curved concave portion with the first end disposed above the second end and the curved concave portion oriented in a downward direction away from the substantially vertically extending surface. The first end of the curved concave portion is connected with the attachment portion.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
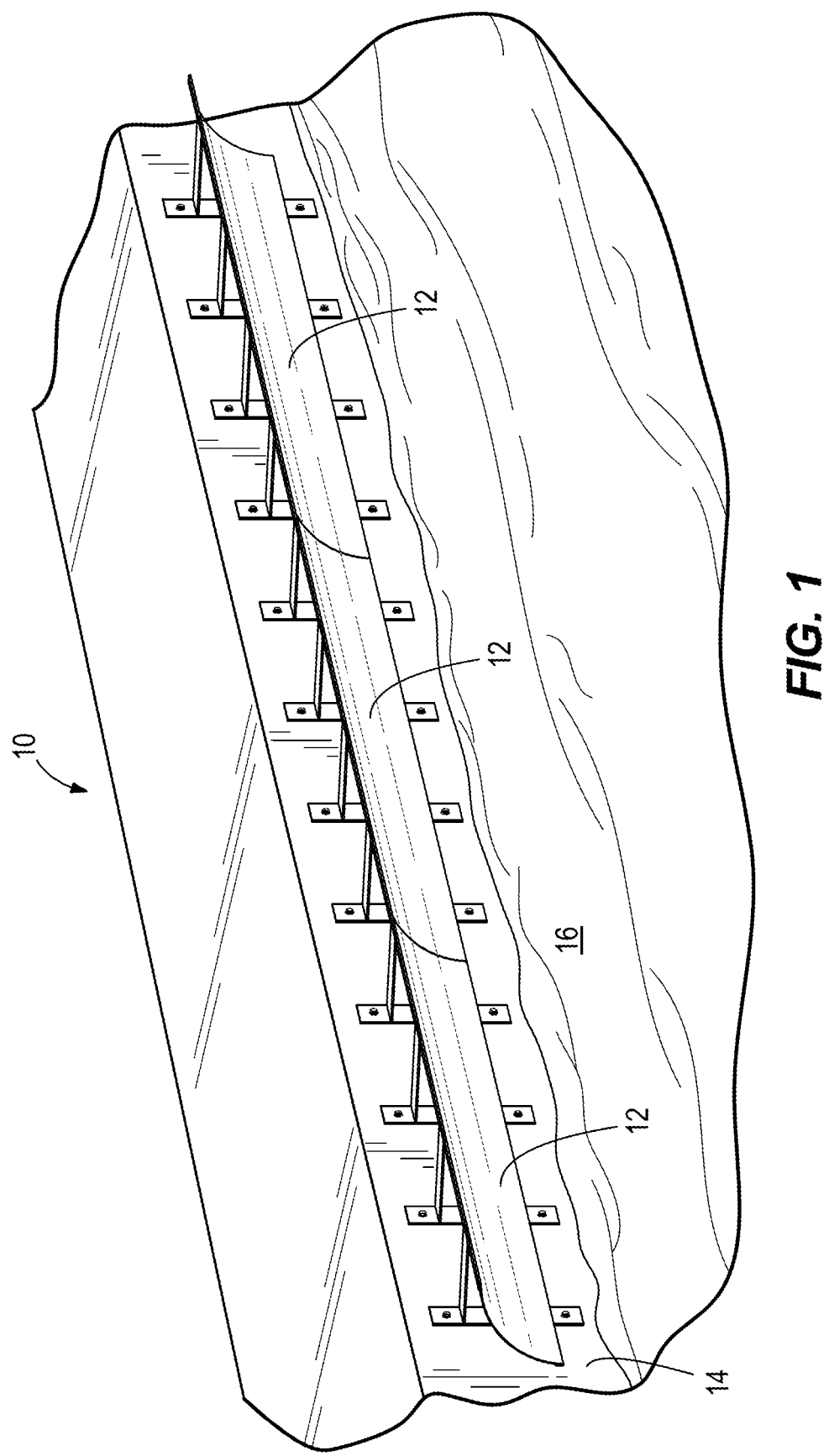
FIG. 1 illustrates a front perspective view of one embodiment of a water wave breaker system including a plurality of water wave apparatus attached to a substantially vertically extending surface which is adjacent to a body of water.
Figure 2:
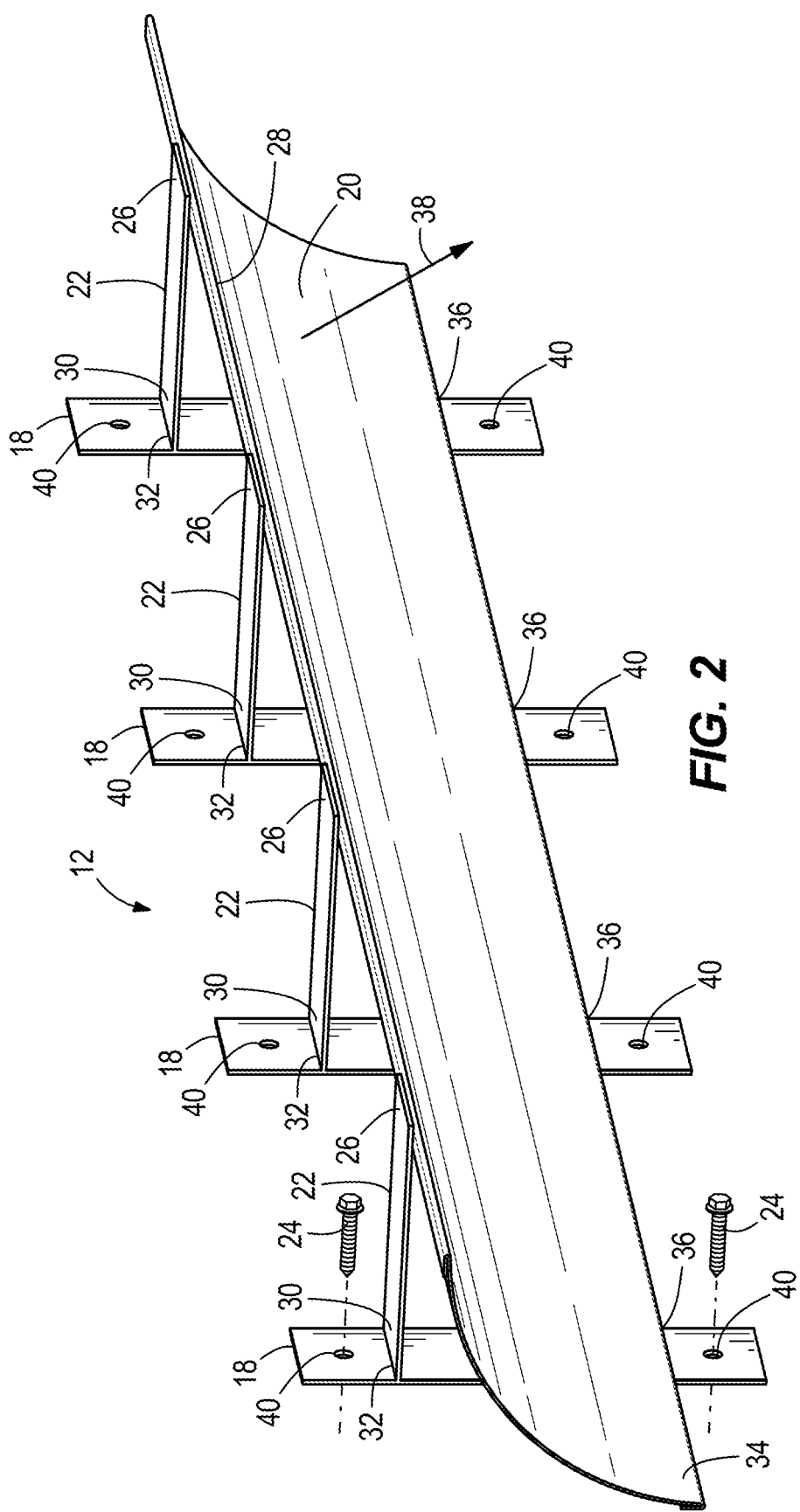
FIG. 2 illustrates a front perspective view of one of the water wave breaker apparatus of the water wave breaker system of FIG. 1 detached from the substantially vertically extending surface.
Figure 3:
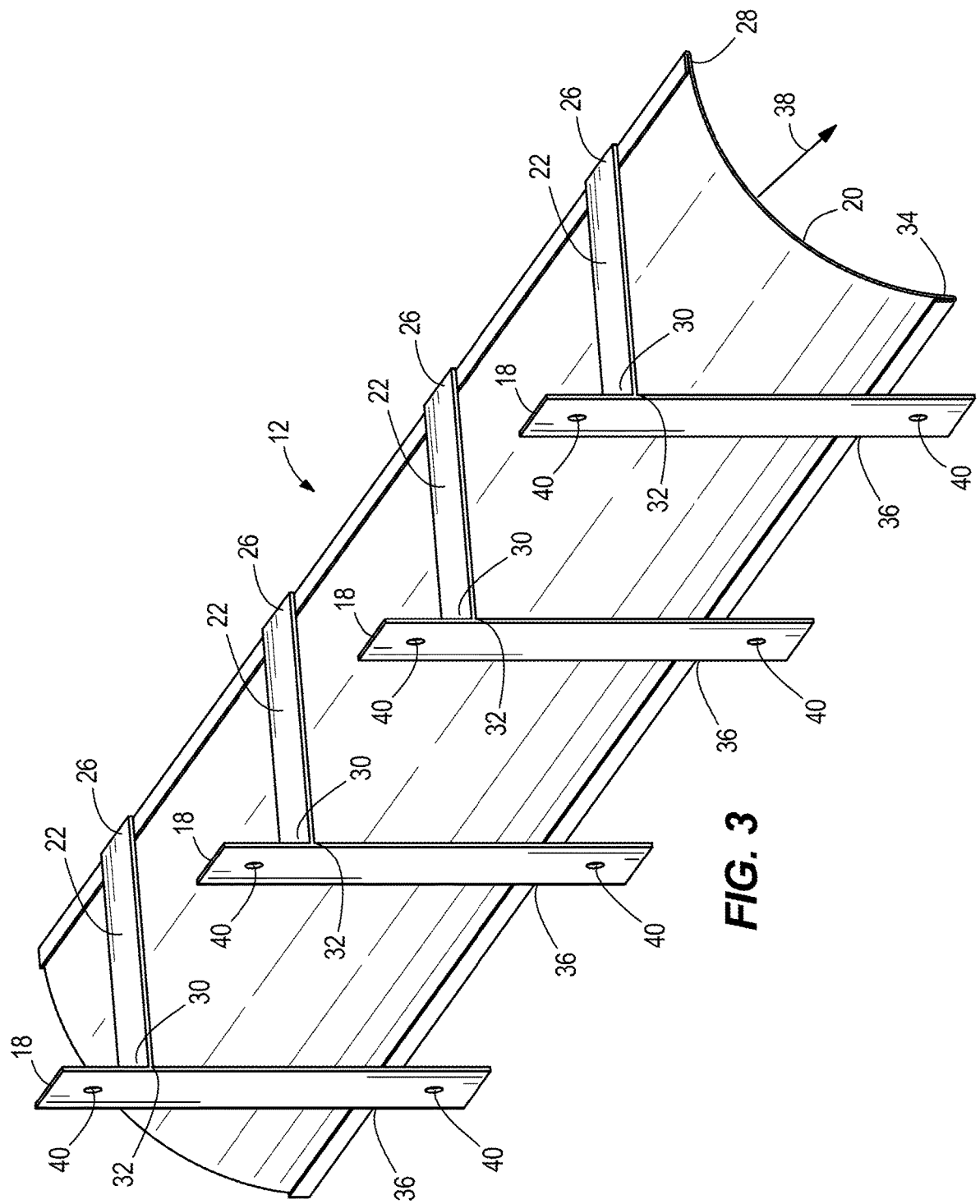
FIG. 3 illustrates a back perspective view of the water wave breaker apparatus of FIG. 2.
Figure 4:
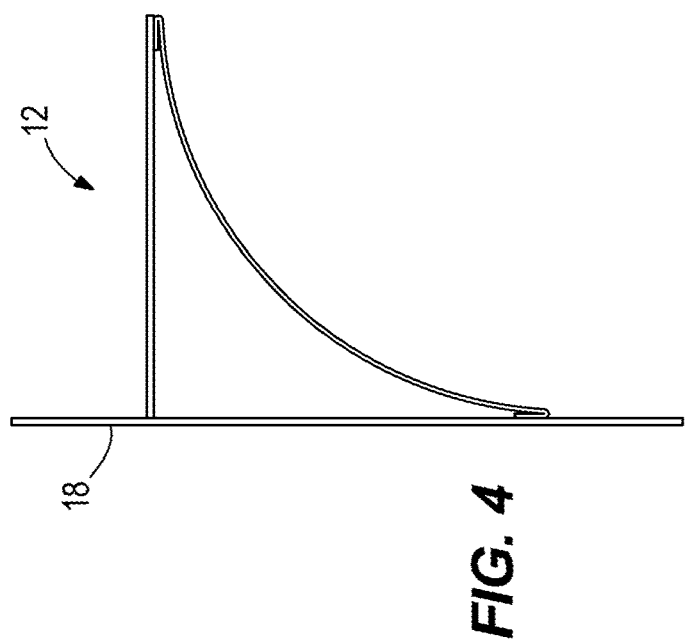
FIG. 4 illustrates a side view of the water wave breaker apparatus of FIG. 2.
Figure 5:
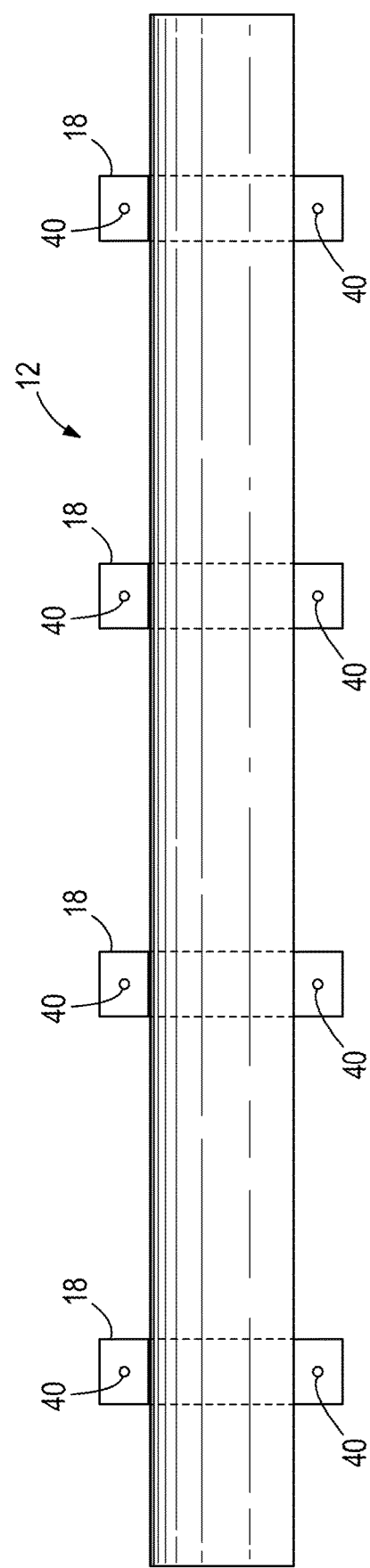
FIG. 5 illustrates a front view of the water wave breaker apparatus of FIG. 2.
Figure 6:
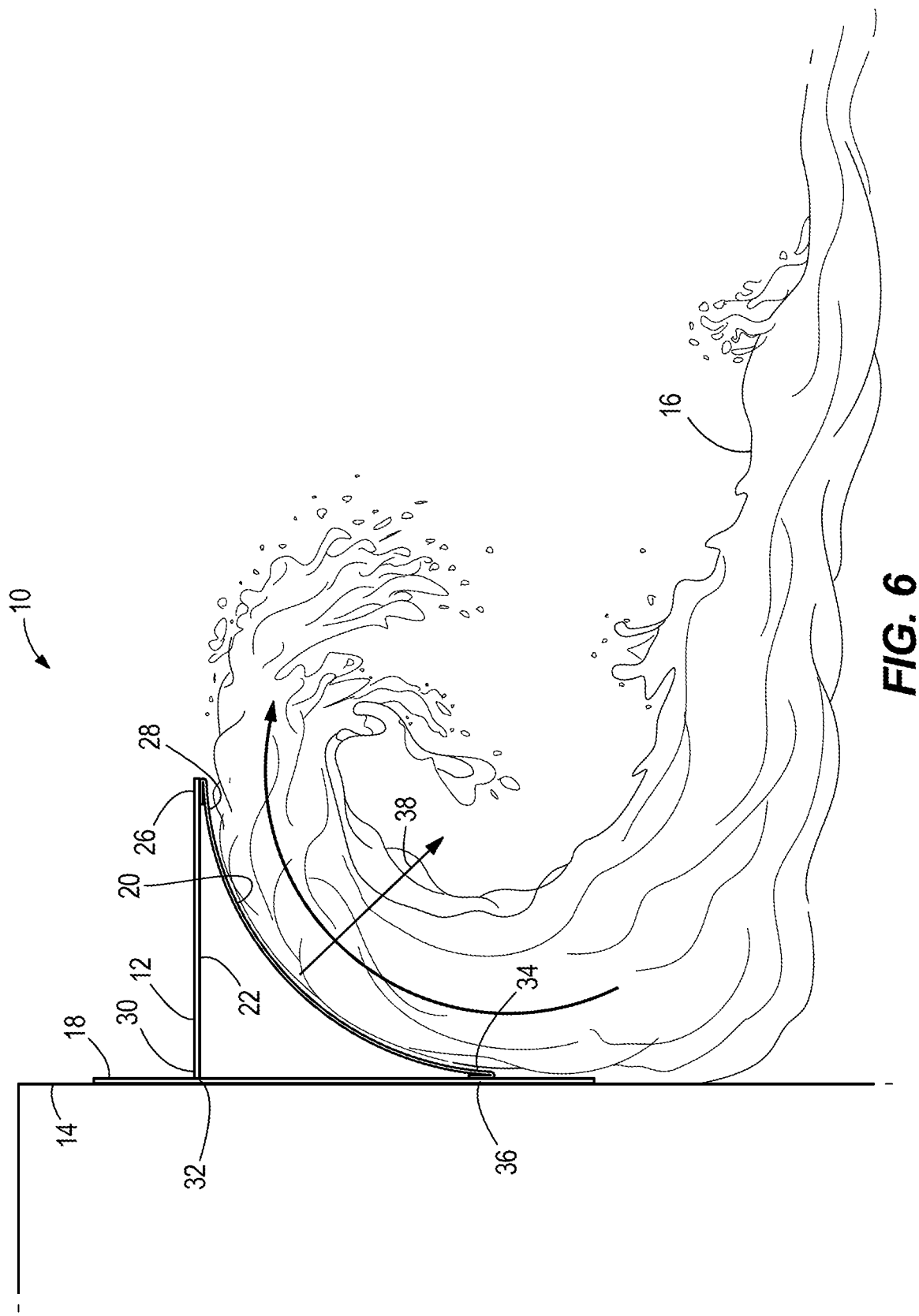
FIG. 6 illustrates a side view of the water wave breaker system of FIG. 1 directing a water wave from the body of water away from the substantially vertically extending surface and back into the body of water.
Figure 7:
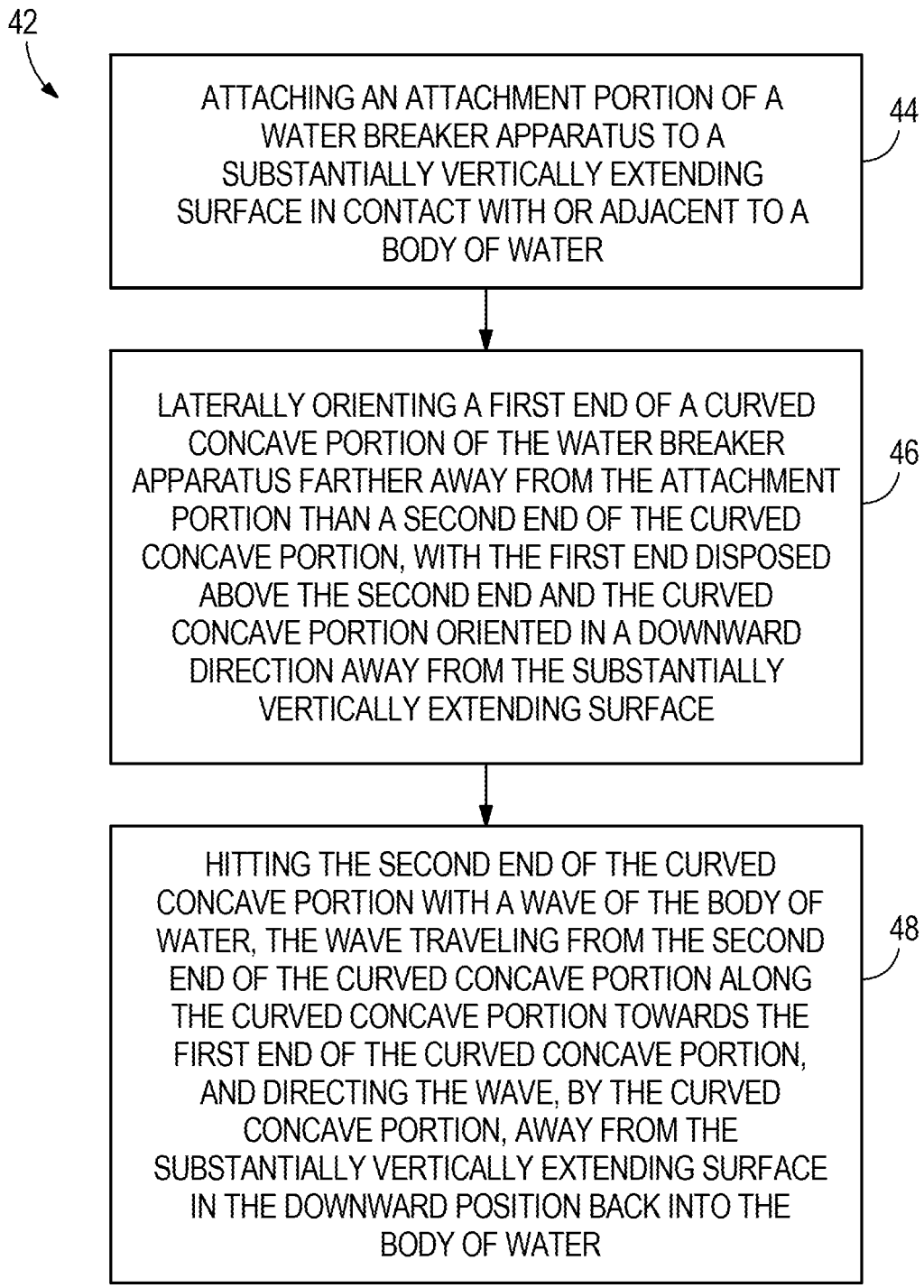
FIG. 7 is a flowchart illustrating one embodiment of a method of erecting and/or using a water breaker system.

FIGS. 1-7 collectively show one embodiment of a water wave breaker system 10. As shown, the water wave breaker system 10 comprises a plurality of water wave breaker apparatus 12 removably disposed against, adjacent, and in lateral alignment relative to one another with each of the water wave breaker apparatus 12 removably attached to a substantially vertically extending surface 14. In one embodiment, the substantially vertically extending surface 14 is disposed entirely along and in a vertical plane. In another embodiment, the substantially vertically extending surface extends within a range of 0 to 10 degrees from extending completely vertically. In yet another embodiment, the substantially vertically extending surface extends within a range of 0 to 45 degrees from extending completely vertically. In still other embodiments, the substantially vertically extending surface 14 extends along and in a non-horizontal plane.

The substantially vertically extending surface 14 is disposed in contact with or adjacent to a body of water 16. The water wave breaker apparatus 12 may be stainless steel or another material. The water wave breaker apparatus 12 divert the splash due to waves from the body of water 16 away from the substantially vertically extending surface 14. The water wave breaker apparatus 12 protect against erosion caused by the repetitive destructive force of incoming water waves. The body of water 16 may comprise a lake, a river, an ocean, or another large body of water. The substantially vertically extending surface 14 may comprise any type of surface which needs to be protected from incoming waves such as a water breaker wall, a wall of or adjacent to a boat house, a wall connected to or adjacent a walkway, a wall of or adjacent to a beach, or another type of surface. The water wave breaker apparatus 12 may prevent water from splashing on a walkway which may stop someone from slipping and falling, may prevent water from splashing into a boat house, or may protect varying structures in other ways.

Each of the water wave breaker apparatus 12 comprise an attachment portion 18, a curved concave portion 20, a connection portion 22, and at least one fastener 24. The curved concave portion 20 is connected with the attachment portion 18. The curved concave portion 20 comprises a quarter-circle. In other embodiments, the curved concave portion 20 may vary in quantity, shape, size, configuration, and/or orientation.

The connection portion 22 is connected between and to the curved concave portion 20 and the attachment portion 18. The connection portion 22 extends linearly in a substantially horizontal plane. In one embodiment, the connection portion 22 is disposed entirely along and in a horizontal plane. In another embodiment, the connection portion 22 extends within a range of 0 to 10 degrees from extending completely horizontally. In yet another embodiment, the connection portion 22 extends within a range of 0 to 45 degrees from extending completely horizontally. In still another embodiment, the connection portion 22 extends along and in a non-vertical plane. In other embodiments, the connection portion 22 may extend in any direction, orientation, or configuration.

A first end 26 of the connection portion 22 is attached to a first end 28 of the curved concave portion 20. The first end 26 of the connection portion 22 may be welded to the first end 28 of the curved concave portion 20. In other embodiments, the first end 26 of the connection portion 22 may be attached to the first end 28 of the curved concave portion 20 through other attachment methods, and/or a varied location of the connection portion 22 may be attached to a varied portion of the cured concave portion 20. In still other embodiments, the connection portion 22 and the curved concave portion 20 may comprise one integral part.

A second end 30 of the connection portion 22 is attached to the attachment portion 18 at a connection location 32. The second end 30 of the connection portion 22 may be welded to the attachment portion 18 at the connection location 32. In other embodiments, the second end 30 of the connection portion 22 may be attached to the attachment portion 18 at the connection location 32 through other attachment methods, and/or a varied location of the connection portion 22 may be attached to a varied portion of the attachment portion 18. In still other embodiments, the connection portion 22 and the attachment portion 18 may comprise one integral part.

A second end 34 of the curved concave portion 20 is attached to the attachment portion 18 at a second connection location 36. The connection location 32 is disposed above the second connection location 36. The second end 34 of the curved concave portion 20 may be welded to the attachment portion 18 at the second connection location 36. In other embodiments, the second end 34 of the curved concave portion 20 may be attached to the attachment portion 18 at the second connection location 36 through other attachment methods, and/or a varied location of the curved concave portion 20 may be attached to a varied portion of the attachment portion 18. In still other embodiments, the curved concave portion 20 and the attachment portion 18 may comprise one integral part.

The first end 28 of the curved concave portion 20 is disposed laterally farther away from the attachment portion 18 than the second end 34 of the curved concave portion 20. The first end 28 of the curved concave portion 20 is disposed above the second end 34 of the curved concave portion 20. The curved concave portion 20 is oriented in a downward direction 38 away from the substantially vertically extending surface 14 to direct waves from the body of water 16 away from the substantially vertically extending surface 14. When the waves of the body of water 16 hit the second end 34 of the curved concave portion 20, they travel from the second end 34 of the curved concave portion 20, along the curved concave portion 20, towards the first end 28 of the curved concave portion 20, and are then directed by the curved concave portion 20 in the downward direction 38 away from the substantially vertically extending surface 14 back into the body of water 16.

The attachment portion 18 is removably attached to the substantially vertically extending surface 14 due to at least one fastener 24 extending through at least one fastener hole 40 in the attachment portion 18 into the substantially vertically extending surface 14. When attached to the substantially vertically extending surfaced 14, the attachment portion 18 extends linearly in a substantially vertical plane. The at least one fastener 24 may comprise any type of fastener such as a bolt, rivet, screw, nail, or other type of fastener. Multiple fasteners 24 may be used for each water wave breaker apparatus 12 to attach each to the substantially vertically extending surface 14. In still other embodiments, the attachment portion 18 may be removably attached to the substantially vertically extending surface 14 using varying attachment mechanisms.

In other embodiments, the water wave breaker system 10, the water wave breaker apparatus 12, the substantially vertically extending surface 14, the attachment portion 18, the curved concave portion 20, the connection portion 22, and/or the at least one fastener 24 may vary in quantity, shape, size, configuration, and/or orientation. For instance, in one embodiment of a water wave breaker system 10, in each water wave breaker apparatus 12 the connection portion 22 may be eliminated and the curved concave portion 20 may be attached directly to the attachment portion 18. In still another embodiment of a water wave breaker system 10, in each water wave breaker apparatus 12 both the connection portion 22 and the attachment portion 18 may be eliminated and the curved concave portion may be attached directly to the substantially vertically extending surface 14.

FIG. 8 illustrates one embodiment of a method 42 of erecting and/or using a water breaker system. The method 42 may erect and/or use any of the water breaker systems disclosed herein. In other embodiments, the method 42 may erect and/or use varying water breaker systems. In step 44, an attachment portion of a water breaker apparatus may be attached to a substantially vertically extending surface in contact with or adjacent to a body of water. The substantially vertically extending surface may comprise a water breaker wall, or other types of surfaces in need of protection from a wave of water. Step 44 may further comprise attaching the attachment portion to the substantially vertically extending surface so that it extends linearly in a substantially vertical plane. Step 44 may additionally comprise extending at least one fastener through at least one fastener hole in the attachment portion into the substantially vertically extending surface. In other embodiments, the attachment portion of the water breaker apparatus may be attached to the substantially vertically extending surface in various ways.

In step 46, a first end of a curved concave portion of the water breaker apparatus may be oriented laterally farther away from the attachment portion than a second end of the curved concave portion with the first end disposed above the second end and the curved concave portion oriented in a downward direction away from the substantially vertically extending surface. The first end of the curved concave portion may be connected with the attachment portion. The curved concave portion may comprise a quarter-circle. In other embodiments, the curved concave portion and attachment portion may vary. Step 46 may further comprise disposing the curved concave portion in a fixed position above the body of water. Step 46 may additionally comprise disposing a connection portion, connected between and to the curved concave portion and the attachment portion, to extend linearly in a substantially horizontal plane. A first end of the connection portion may be attached to the first end of the curved concave portion and a second end of the connection portion may be attached to the attachment portion at a connection location. A second end of the curved concave portion may be attached to the attachment portion at a second connection location, wherein the connection location is disposed above the second connection location. In other embodiments, the connection portion may vary.

In step 48, a wave of the body of water may hit the second end of the curved concave portion, travel from the second end of the curved concave portion along the curved concave portion towards the first end of the curved concave portion, and be directed by the curved concave portion away from the substantially vertically extending surface in the downward position back into the body of water. In other embodiments, the curved concave portion may direct the water away from the substantially vertically extending surface in varying ways.

In other embodiments, one or more steps of the method 42 may vary in substance or order, may not be followed, or one or more additional steps may be added. In still other embodiments, the method 42 may vary further.

One or more embodiments of the disclosure may protect structures from the damaging effects of income water waves, may protect walkways, may protect against erosion, and/or may have one or more other advantages.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A water wave breaker apparatus comprising:
    an attachment portion comprising at least one fastener hole;
    a curved concave portion attached directly to the attachment portion;
    a connection portion, which is linear, attached directly to the curved concave portion and directly to the attachment portion; and
    at least one fastener, comprising a bolt, a rivet, a screw, or a nail, configured to extend through the at least one fastener hole in the attachment portion;
    wherein when the attachment portion is attached with the at least one fastener extending through the at least one fastener hole into and to a substantially vertically extending surface, comprising a surface which the water wave breaker apparatus protects from incoming water waves, a first end of the curved concave portion, which is disposed laterally farther away from the attachment portion than a second end of the curved concave portion, is disposed above the second end of the curved concave portion with the curved concave portion oriented in a downward direction away from the substantially vertically extending surface.

2. The water wave breaker apparatus of claim 1 wherein the attachment portion extends linearly in a substantially vertical plane when attached to the substantially vertically extending surface.

3. The water wave breaker apparatus of claim 1 wherein the connection portion is disposed between the curved concave portion and the attachment portion.

4. The water wave breaker apparatus of claim 3 wherein the connection portion extends linearly in a substantially horizontal plane when the attachment portion is attached to the substantially vertically extending surface.

5. The water wave breaker apparatus of claim 3 wherein a first end of the connection portion is attached directly to the first end of the curved concave portion and a second end of the connection portion is attached directly to the attachment portion at a connection location.

6. The water wave breaker apparatus of claim 5 wherein the second end of the curved concave portion is attached directly to the attachment portion at a second connection location, wherein the connection location is disposed above the second connection location.

7. The water wave breaker apparatus of claim 6 wherein an area, defined as the area disposed between the curved concave portion, the attachment portion, and the connection portion, is empty.

8. The water wave breaker apparatus of claim 1 wherein the curved concave portion comprises a quarter-circle.

9. The water wave breaker apparatus of claim 1 further comprising:
    a plurality of attachment portions each comprising at least one fastener hole;
    a plurality of fasteners, each comprising a bolt, a rivet, a screw, or a nail, configured to extend through the at least one fastener hole in each of the plurality of attachment portions;
    wherein when the plurality of attachment portions are attached with the plurality of fasteners extending through the at least one fastener hole in each of the plurality of attachment portions to the substantially vertically extending surface the first end of the curved concave portion, which is disposed laterally farther away from the plurality of attachment portions than the second end of the curved concave portion, is disposed above the second end of the curved concave portion with the curved concave portion oriented in a downward direction away from the substantially vertically extending surface.

10. The water wave breaker apparatus of claim 9 wherein the plurality of attachment portions are spaced apart along a length of the curved concave portion.

11. The water wave breaker apparatus of claim 10 further comprising a plurality of connection portions respectively attached between and directly to both the curved concave portion and the plurality of attachment portions, first ends of the connection portions attached directly to the first end of the curved concave portion and second ends of the connection portions attached directly to the respective attachment portions at connection locations.

12. The water wave breaker apparatus of claim 11 wherein the second end of the curved concave portion is attached directly to the plurality of attachment portions at second connection locations, wherein the connection locations are disposed above the second connection locations.

13. The water wave breaker apparatus of claim 1 wherein the substantially vertically extending surface comprises a water breaker wall.

14. The water wave breaker apparatus of claim 1 wherein the connection portion is welded directly to the curved concave portion and welded directly to the attachment portion.

15. The water wave breaker apparatus of claim 1 wherein the curved concave portion is welded directly to the attachment portion.

16. A water breaker system comprising:
    a substantially vertically extending surface in contact with or adjacent to a body of water;
    a water wave breaker apparatus comprising:
        an attachment portion comprising at least one fastener hole attached to the substantially vertically extending surface, comprising a surface which the water wave breaker apparatus protects from incoming water waves;
        a curved concave portion attached directly to the attachment portion;
        a connection portion, which is linear, attached directly to the curved concave portion and directly to the attachment portion; and
        at least one fastener, comprising a bolt, a rivet, a screw, or a nail, extending through the at least one fastener hole in the attachment portion into the substantially vertically extending surface;
        wherein a first end of the curved concave portion, which is disposed laterally farther away from the attachment portion than a second end of the curved concave portion, is disposed above the second end of the curved concave portion with the curved concave portion oriented in a downward direction away from the substantially vertically extending surface.

17. The water breaker system of claim 16 wherein the substantially vertically extending surface comprises a water breaker wall.

18. The water breaker system of claim 16 wherein the attachment portion extends linearly in a substantially vertical plane.

19. The water breaker system of claim 16 wherein the connection portion is disposed between the curved concave portion and the attachment portion.

20. The water breaker system of claim 19 wherein the connection portion extends linearly in a substantially horizontal plane.

21. The water breaker system of claim 19 wherein a first end of the connection portion is attached directly to the first end of the curved concave portion and a second end of the connection portion is attached directly to the attachment portion at a connection location.

22. The water breaker system of claim 21 wherein the second end of the curved concave portion is attached directly to the attachment portion at a second connection location, wherein the connection location is disposed above the second connection location.

23. The water breaker system of claim 22 wherein an area, defined as the area disposed between the curved concave portion, the attachment portion, and the connection portion, is empty.

24. The water breaker system of claim 16 wherein the curved concave portion comprises a quarter-circle.

25. The water breaker system of claim 16 wherein the water wave breaker apparatus further comprises: a plurality of attachment portions each comprising at least one fastener hole attached to the substantially vertically extending surface; and a plurality of fasteners, each comprising a bolt, a rivet, a screw, or a nail, extending through the at least one fastener hole in each of the plurality of attachment portions into the substantially vertically extending surface;
    wherein the first end of the curved concave portion, which is disposed laterally farther away from the plurality of attachment portions than the second end of the curved concave portion, is disposed above the second end of the curved concave portion with the curved concave portion oriented in a downward direction away from the substantially vertically extending surface.

26. The water breaker system of claim 25 wherein the plurality of attachment portions are spaced apart along a length of the curved concave portion.

27. The water breaker system of claim 26 further comprising a plurality of connection portions respectively attached between and directly to both the curved concave portion and the plurality of attachment portions, first ends of the connection portions attached directly to the first end of the curved concave portion and second ends of the connection portions attached directly to the respective plurality of attachment portions at connection locations.

28. The water breaker system of claim 27 wherein the second end of the curved concave portion is attached directly to the plurality of attachment portions at second connection locations, wherein the connection locations are disposed above the second connection locations.

29. The water breaker system of claim 16 wherein the connection portion is welded directly to the curved concave portion and welded directly to the attachment portion.

30. The water breaker system of claim 16 wherein the curved concave portion is welded directly to the attachment portion.

31. A method of erecting a water breaker system comprising:
    attaching an attachment portion, comprising at least one fastener hole, of a water breaker apparatus to a substantially vertically extending surface in contact with or adjacent to a body of water by extending at least one fastener, comprising a bolt, a rivet, a screw, or a nail, through the at least one fastener hole in the attachment portion into the substantially vertically extending surface the substantially vertically extending surface comprising a surface which the water wave breaker apparatus protects from incoming water waves; and
    orienting a first end of a curved concave portion of the water breaker apparatus, the first end directly attached to a connection portion, which is linear, laterally farther away from the attachment portion than a second end of the curved concave portion, which is directly attached to the attachment portion, with the first end disposed above the second end and the curved concave portion oriented in a downward direction away from the substantially vertically extending surface, the connection portion also directly attached to the attachment portion.

32. The method of claim 31 wherein the orienting further comprises disposing the curved concave portion in a fixed position above the body of water.

33. The method of claim 31 wherein the attaching further comprises attaching the attachment portion to the substantially vertically extending surface so that the attachment portion extends linearly in a substantially vertical plane.

34. The method of claim 31 wherein the connection portion is disposed between the curved concave portion and the attachment portion.

35. The method of claim 34 wherein the orienting further comprises disposing the connection portion to extend linearly in a substantially horizontal plane.

36. The method of claim 34 wherein a first end of the connection portion is attached directly to the first end of the curved concave portion and a second end of the connection portion is attached directly to the attachment portion at a connection location.

37. The method of claim 36 wherein the second end of the curved concave portion is attached directly to the attachment portion at a second connection location, wherein the connection location is disposed above the second connection location.

38. The method of claim 31 wherein the curved concave portion comprises a quarter-circle.

39. The method of claim 31 further comprising a wave of the body of water hitting the second end of the curved concave portion, traveling from the second end of the curved concave portion along the curved concave portion towards the first end of the curved concave portion, and being directed by the curved concave portion away from the substantially vertically extending surface in the downward direction.

40. The method of claim 39 wherein the substantially vertically extending surface comprises a water breaker wall.

41. The method of claim 31 further comprising attaching a plurality of attachment portions, each comprising at least one fastener hole, of the water breaker apparatus to the substantially vertically extending surface in contact with or adjacent to the body of water by extending a plurality of fasteners, each comprising a bolt, a rivet, a screw, or a nail, through the at least one fastener hole in each of the plurality of attachment portions into the substantially vertically extending surface.

42. The method of claim 41 further comprising spacing the plurality of attachment portions apart along a length of the curved concave portion.

43. The method of claim 42 further comprising connecting a plurality of connection portions between and directly to both the curved concave portion and the plurality of attachment portions, attaching first ends of the connection portions directly to the first end of the curved concave portion and attaching second ends of the connection portions directly to the respective plurality of attachment portions at connection locations.

44. The method of claim 43 further comprising attaching the second end of the curved concave portion directly to the plurality of attachment portions at second connection locations with the connection locations being disposed above the second connection locations.

45. The method of claim 31 wherein the connection portion is welded directly to the curved concave portion and welded directly to the attachment portion.

46. The method of claim 31 wherein the curved concave portion is welded directly to the attachment portion.

* * * * *